United States Patent
Prakash et al.

(10) Patent No.: US 9,147,119 B2
(45) Date of Patent: Sep. 29, 2015

(54) SYSTEM, DEVICE, AND METHOD FOR DETECTING AND LOCATING WANTED VEHICLES

(71) Applicants: Gyan Prakash, Beaverton, OR (US); Rajesh Poornachandran, Portland, OR (US); Saurabh Dadu, Tigard, OR (US); Ashok K. Mishra, Portland, OR (US); Ravikiran Chukka, Beaverton, OR (US)

(72) Inventors: Gyan Prakash, Beaverton, OR (US); Rajesh Poornachandran, Portland, OR (US); Saurabh Dadu, Tigard, OR (US); Ashok K. Mishra, Portland, OR (US); Ravikiran Chukka, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 166 days.

(21) Appl. No.: 13/715,541

(22) Filed: Dec. 14, 2012

(65) Prior Publication Data
US 2014/0169634 A1 Jun. 19, 2014

(51) Int. Cl.
*G06K 9/00* (2006.01)
*G06K 9/32* (2006.01)

(52) U.S. Cl.
CPC .......... *G06K 9/3258* (2013.01); *G06K 9/00791* (2013.01)

(58) Field of Classification Search
CPC ....................................................... G06K 9/78
USPC ........................................................ 382/105
See application file for complete search history.

(56) References Cited

U.S. PATENT DOCUMENTS

| 2005/0064866 A1* | 3/2005 | Sun et al. ................... 455/426.1 |
| 2007/0139182 A1* | 6/2007 | O'Connor et al. ............ 340/521 |
| 2007/0140163 A1* | 6/2007 | Meier et al. .................... 370/329 |
| 2009/0202149 A1* | 8/2009 | Doi et al. ....................... 382/173 |
| 2013/0131921 A1* | 5/2013 | Uhlmann et al. ............... 701/36 |

FOREIGN PATENT DOCUMENTS

| WO | WO 2008055117 A2 * | 5/2008 | .............. B60R 11/02 |
| WO | WO 2008055117 A3 * | 10/2008 | |

OTHER PUBLICATIONS

"Backup camera," Wikipedia, The Free Encyclopedia, retrieved from: <http://en.wikipedia.org/w/index.php?title=Backup_camera &oldid=498492305>, edited Jun. 20, 2012, 2 pages.
"Automatic number plate recognition," Wikipedia, The Free Encyclopedia, retrieved from: <http://en.wikipedia.org/w/index. php?title=Automatic_number_plate_recognition &oldid=497352971>, edited Jun. 13, 2012, 16 pages.

* cited by examiner

Primary Examiner — Stephen R Koziol
Assistant Examiner — Delomia Gilliard
(74) Attorney, Agent, or Firm — Barnes & Thornburg LLP

(57) ABSTRACT

A method, system, and device for analyzing images captured by a vehicle-based camera includes establishing a communication connection between a mobile communication device and an in-vehicle computing system. Scanning data may be retrieved from a scanning data server by the mobile communication device and, in some embodiments, forwarded to the in-vehicle computing system. A vehicle-base camera may be used to capture one or more images. An image analysis module of the in-vehicle computing system or mobile communication device may be used to analyze the captured image(s) for a match between the image(s) and the scanning data. In response to identifying a match, the mobile communication device may notify the scanning data server of the identified match.

24 Claims, 7 Drawing Sheets

SYSTEM, DEVICE, AND METHOD FOR DETECTING AND LOCATING WANTED VEHICLES

BACKGROUND

Law enforcement agencies implement a wide array of systems and technologies for tracking and identifying fugitives. For example, law enforcement officers typically drive vehicles with in-vehicle or peripheral systems for cross-referencing vehicle license plate numbers via input data supplied by the officers. In addition, many law enforcement vehicles include dashboard cameras, which are used to record fugitive vehicle pursuits and routine traffic stops, among other things.

In lockstep with advances in law enforcement vehicle technology, mainstream consumer vehicles continue to incorporate technology and vehicle options as standard features that were formerly reserved for luxury vehicles. For example, many consumer vehicles now include rearview backup cameras, and sometimes even front-view cameras, to help drivers safely operate their vehicles. Additionally, in-vehicle infotainment systems often allow drivers and passengers to link their smartphones and other mobile communication devices, which drivers often utilize to, for example, use an in-vehicle speakerphone system or play music stored on the devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
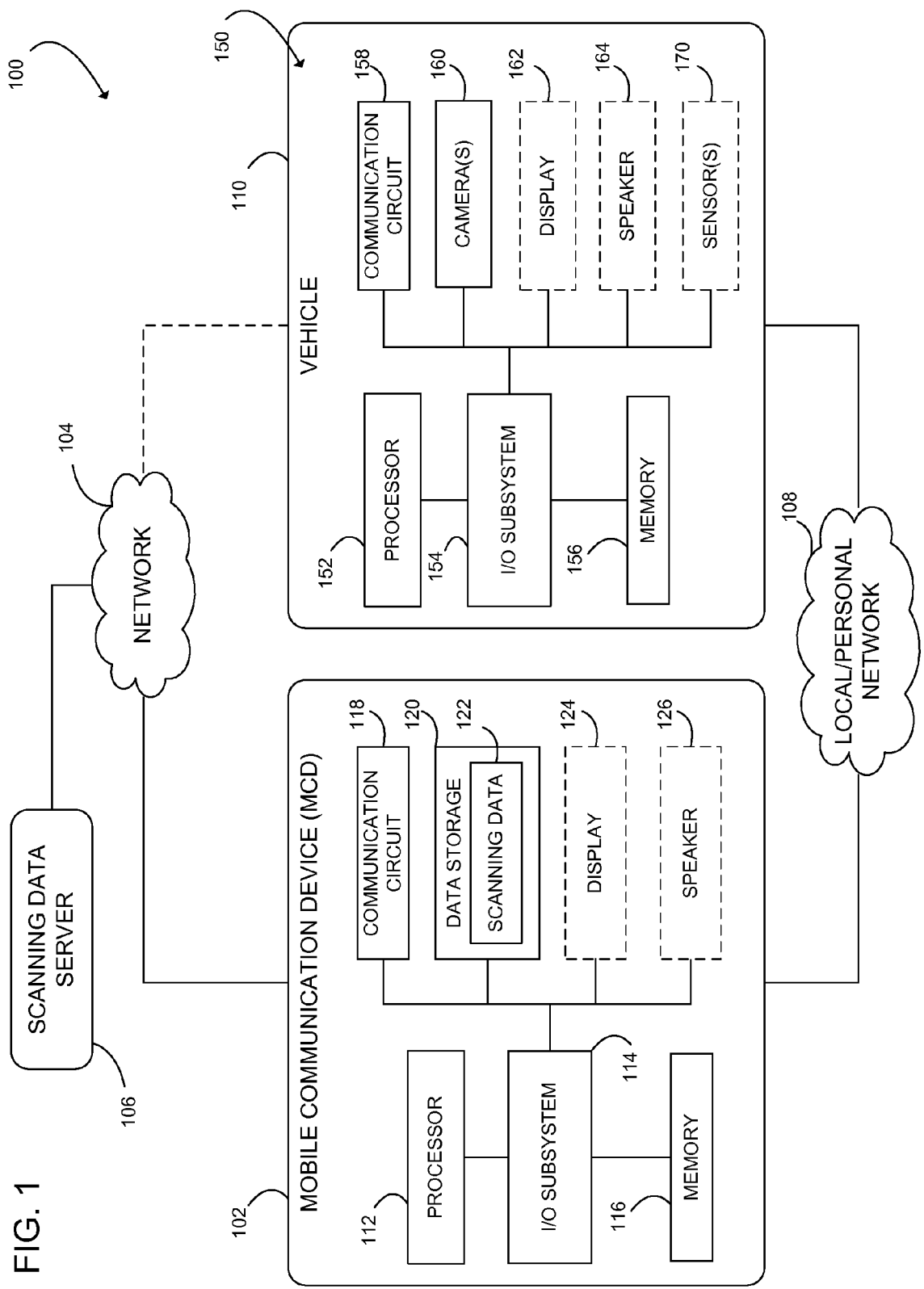
FIG. 1 is a simplified block diagram of at least one embodiment of a system for analyzing images captured by a vehicle-based camera.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for analyzing images captured by a vehicle-based camera includes a mobile communication device 102, a network 104, a scanning data server 106, a local/personal network 108, and a vehicle 110. In use, as discussed in more detail below, the mobile communication device 102 may communicate with the scanning data server 106 over the network 104 to retrieve scanning data, such as reference license plate numbers, for use in analyzing images captured by a camera 160 of the vehicle 110. Further, the mobile communication device 102 may communicate with the vehicle 110 over the local/personal network 108 to transmit the scanning data, captured images, and/or alert notifications. Although only one mobile communication device 102, one network 104, one scanning data server 106, one local/personal network 108, and one vehicle 110 are illustratively shown in FIG. 1, the system 100 may include any number of mobile communication devices 102, networks 104, scanning data servers 106, local/personal networks 108, and vehicles 110 in other embodiments.

The mobile communication device 102 may be embodied as any type of computing device capable of establishing a communication link with the vehicle 110 and performing the functions described herein. For example, the mobile communication device 102 may be embodied as a cellular phone, tablet computer, laptop computer, personal digital assistant, mobile Internet device, or other mobile computing/communication device. As shown in FIG. 1, the illustrative mobile communication device 102 is embodied as a "smartphone" and includes a processor 112, an input/output ("I/O") subsystem 113, a memory 116, a communication circuit 118, a data storage 120, scanning data 122, a display 124, and a speaker 126. Of course, the mobile communication device 102 may include other or additional components, such as those commonly found in a communication or computing device (e.g., various input/output devices), in other embodiments. Additionally, in some embodiments, one or more of the illustrative components may be incorporated in, or otherwise from a portion of, another component. For example, the memory 116, or portions thereof, may be incorporated in the processor 112 in some embodiments.

The processor 112 may be embodied as any type of processor currently known or developed in the future and capable of performing the functions described herein. For example, the processor may be embodied as a single or multi-core processor(s), digital signal processor, microcontroller, or other processor or processing/controlling circuit. Similarly, the memory 116 may be embodied as any type of volatile or non-volatile memory or data storage currently known or developed in the future and capable of performing the functions described herein. In operation, the memory 116 may store various data and software used during operation of the mobile communication device 102 such as operating systems, applications, programs, libraries, and drivers. The memory 116 is communicatively coupled to the processor 112 via the I/O subsystem 114, which may be embodied as circuitry and/or components to facilitate input/output operations with the processor 112, the memory 116, and other components of the mobile communication device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 112, the memory 116, and other components of the mobile communication device 102, on a single integrated circuit chip.

The communication circuit 118 of the mobile communication device 102 may be embodied as any communication circuit, device, or collection thereof, capable of enabling communications between the mobile communication device 102 and the scanning data server 106, the vehicle 110, and/or other remote devices. The communication circuit 118 may be configured to use any one or more communication technology (e.g., wireless or wired communications) and associated protocols (e.g., Ethernet, Bluetooth®, Wi-Fi®, WiMAX, etc.) to effect such communication. For example, in some embodiments, the communication circuit 118 may be embodied as, or otherwise include, near field communication circuitry, Bluetooth® communication circuitry, Wi-Fi® communication circuitry, and/or other short-ranged wireless communication circuitry. Additionally, in some embodiments, the communication circuit 118 may include long-ranged wireless communication circuitry such as, for example, cellular communication circuitry and/or other long-ranged wireless communication circuitry.

The data storage 120 may be embodied as any type of device or devices configured for short-term or long-term storage of data such as, for example, memory devices and circuits, memory cards, hard disk drives, solid-state drives, or other data storage devices. In the illustrative embodiment, the mobile communication device 102 may maintain the scanning data 122 and/or other information in the data storage 120. As discussed in more detail below, the scanning data 122 may identify one or more reference license plate numbers.

The display 124 of the mobile communication device 102 may be embodied as any one or more display screens on which information may be displayed to a viewer of the mobile communication device 102. The display may be embodied as, or otherwise use, any suitable display technology including, for example, a liquid crystal display (LCD), a light emitting diode (LED) display, a cathode ray tube (CRT) display, a plasma display, and/or other display technology currently known or developed in the future. Although only a single display 124 is illustrated in FIG. 1, it should be appreciated that the mobile communication device 102 may include multiple displays or display screens on which the same or different content may be displayed contemporaneously or sequentially with each other. The speaker 126 of the mobile communication device 102 may be embodied as any type of audio rendering device capable of emitting audio signals audible to a user of the mobile communication device 102.

The network 104 may be embodied as any number of various wired and/or wireless telecommunication networks. For example, the network 104 may be embodied as or otherwise include one or more cellular networks, telephone networks, local or wide area networks, publicly available global networks (e.g., the Internet), or any combination thereof. For example, in one embodiment, the network 104 is embodied as or otherwise includes a Global System for Mobile Communications (GSM) cellular network. The local/personal network 108 may be embodied as any local and/or personal network for establishing a communication connection between the mobile communication device 102 and the vehicle 110. In some embodiments, the local/personal network 108 may be substantially similar to the network 104. In other embodiments such as the illustrative embodiments, however, the network 104 may be, for example, a publicly available network and the local/personal network 108 may be a short-ranged network (e.g., using Bluetoote).

The scanning data server 106 may be embodied as any server or computing device capable of storing the scanning data 122 and performing the functions described herein. The scanning data server 106 may include components similar to the mobile communication device 102 and/or components commonly found in a server, such as a processor, memory, I/O subsystem, data storage, peripheral devices, and so forth, which are not illustrated in FIG. 1 for clarity of the description.

The vehicle 110 may include an in-vehicle computing system 150, which may be embodied as any type of computing system capable of performing the functions described herein. For example, in some embodiments, the in-vehicle computing system 105 may be embodied as, or form a portion of, an in-vehicle infotainment system, a navigation system, and/or other vehicle-based computing system. The illustrative in-vehicle computing system 150 includes a processor 152, an I/O subsystem 154, a memory 156, a communication circuit 158, a display 162, and a speaker 164. Those components of the in-vehicle computing system 150 may be similar to the corresponding components of the mobile communication device 102, the description of which is applicable to the corresponding components of the in-vehicle computing system 150 and is not repeated herein for clarity of the description. In the illustrative embodiment, the in-vehicle computing system 150 also includes one or more cameras 160 for capturing images and/or video and one or more sensors 170. In some embodiments, the one or more cameras 160 may be embodied as a rearview backup camera, a dashboard camera, and/or one or more cameras placed in different locations on the vehicle. Further, in some embodiments, the one or more sensors 170 may be used to determine, for example, when the in-vehicle computing system 150 should capture image(s) for analysis as discussed below regarding FIG. 7. The sensors 170 may include, for example, proximity sensors, optical sensors, light sensors, audio sensors, temperature sensors, motion sensors, and/or other types of sensors. Furthermore, it should be appreciated that the in-vehicle computing system 150 may include other components, sub-components, and devices commonly found in a computing device, which are not illustrated in FIG. 1 for clarity of the description.

The system 100 may be used in different embodiments for an array of different purposes. For example, in one embodiment, the system 100 may be implemented as a law enforcement agency scanning service for tracking blacklisted vehicle license plates. In such an embodiment, the scanning data server 106 may store blacklisted license plate numbers or image templates, which may be used by the mobile communication device 102 and the in-vehicle computing system 150 to detect a match with captured images of license plates from vehicles driving nearby the vehicle 110. In another embodiment, a law enforcement agency scan service may store facial images of fugitives for comparison by the mobile communication device 102 and/or the in-vehicle computing system 150 to captured images of nearby drivers and/or pedestrians. Although only law enforcement examples are discussed herein, the system 100 may be used for other crowd sourcing purposes and is not so limited. It should be appreciated that in some embodiments, the communication between the mobile communication device 102 and the vehicle 110 and the scanning data server 106 may be encrypted or otherwise secured. Moreover, in some embodiments, the scanning data 122 is secured on the mobile communication device 102 and/or in-vehicle computing system 150 and inaccessible to a user. Further, in some embodiments, the in-vehicle computing system 150 may directly communicate with the scanning data server 106 via the network 104.

Figure 2:
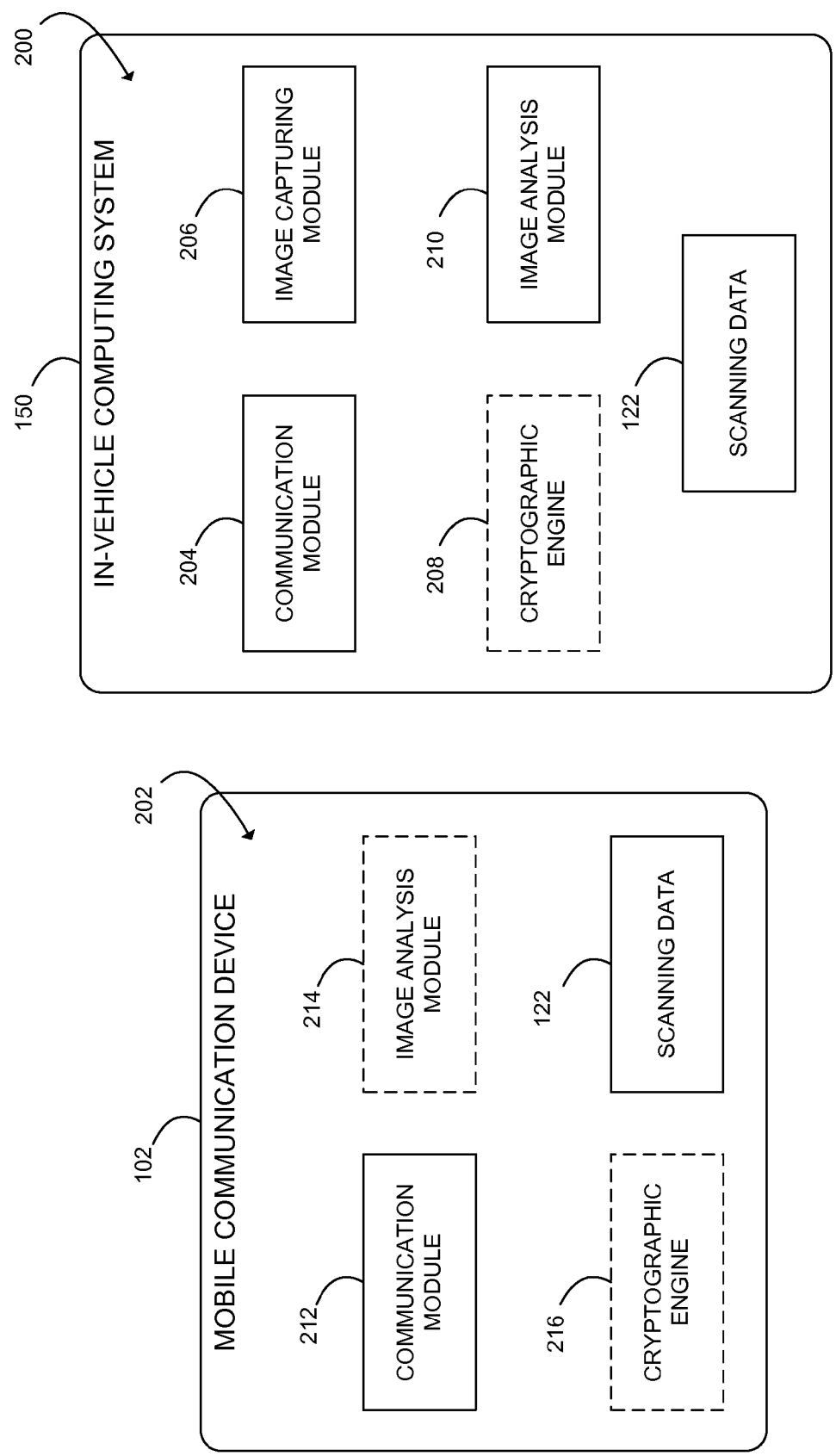
FIG. 2 is a simplified block diagram of at least one embodiment of environments of a mobile communication device and an in-vehicle computing system of the system of FIG. 1.

As shown in FIG. 2, the in-vehicle computing system 150 may establish an environment 200, and the mobile communication device 102 may establish an environment 202 for analyzing images captured by the vehicle-based camera(s) 160 as a function of the scanning data 122. The environment 200 in the illustrative embodiment includes a communication module 204, an image capturing module 206, a cryptographic engine 208, and an image analysis module 210.

The image capturing module 206 may capture video or images with the one or more cameras 160 of the vehicle 110. In some embodiments, the image capturing module 206 may determine which of the cameras 160 to use in capturing images. In doing so, in some embodiments, the image capturing module 206 may consider preferences established by the owner or user of the vehicle, law enforcement agency policies, the intended use of the images, and/or other information. For example, in some embodiments, the image capturing module 206 may consider the vehicle's geographical location in determining which cameras 160 to use. That is, if the intended use is to cross-reference captured license plate numbers with blacklisted fugitive license plate numbers and the vehicle is in a state that does not require frontend license plates, the image capturing module 206 may determine not to use a rearview camera of the vehicle 110. However, if the purpose of the image analysis is to identify individuals via facial recognition, for example, then the image capturing module 206 may determine to use only rearview cameras of the vehicle 110.

In some embodiments, the environment 200 may include the cryptographic engine 208, which may be used to perform cryptographic functions. In some embodiments, the cryptographic engine 208 may be embodied as a security co-processor of the in-vehicle computing system 150, a cryptographic accelerator incorporated into the processor 152, or a stand-alone cryptographic software/firmware. The cryptographic engine 208 may be configured to encrypt and decrypt communications between the in-vehicle computing system 150 and remote computing devices (e.g., the mobile communication device 102).

The image analysis module 210 may analyze one or more images captured with the cameras 160 of the vehicle 110. As discussed below, the image analysis module 210 may be used to determine whether there is a match between an image captured by the camera 160 and the scanning data 122. In some embodiments, the scanning data 122 may include a list of reference license plate numbers. In such an embodiment, the camera 160 may be used to capture an image of a license plate of another vehicle. The image analysis module 210 may use a suitable image analysis technique to identify the license plate number from the captured image and compare that number to the reference license plate numbers. In other embodiments, the scanning data 122 may include a set of images of reference license plates. In those embodiments, the image analysis module 210 may identify the license plate number associated with each reference image and compare those numbers to each captured license plate number. In other embodiments, the image analysis module 210 may instead compare the reference images to the captured images without identifying the associated license plate numbers. Similarly, in embodiments in which the scanning data 122 includes other data (e.g., facial images or templates), the image capturing module 206 may capture appropriate images from the camera 160, and the image analysis module 210 may use any suitable image analysis technique suitable for comparing the images. In some embodiments, the in-vehicle computing system 150 includes multiple processors 152 and the image analysis module 210 is run on a non-critical task processor of the multiple processors 152.

The communication module 204 may handle the communication between the in-vehicle computing system 150 and remote computing devices (e.g., the mobile communication device 102), through the local/personal network 108. Each of the communication module 204, the image capturing module 206, the cryptographic engine 208, and the image analysis module 210 may be embodied as hardware, software, firmware, or a combination thereof. The environment 202 of the mobile communication device 102 may include a communication module 212, an image analysis module 214, an a cryptographic engine 216, which may be similar to the corresponding components of the environment 200 of the in-vehicle computing system 150, the description of which is not repeated herein for clarity of the description.

Figure 3:
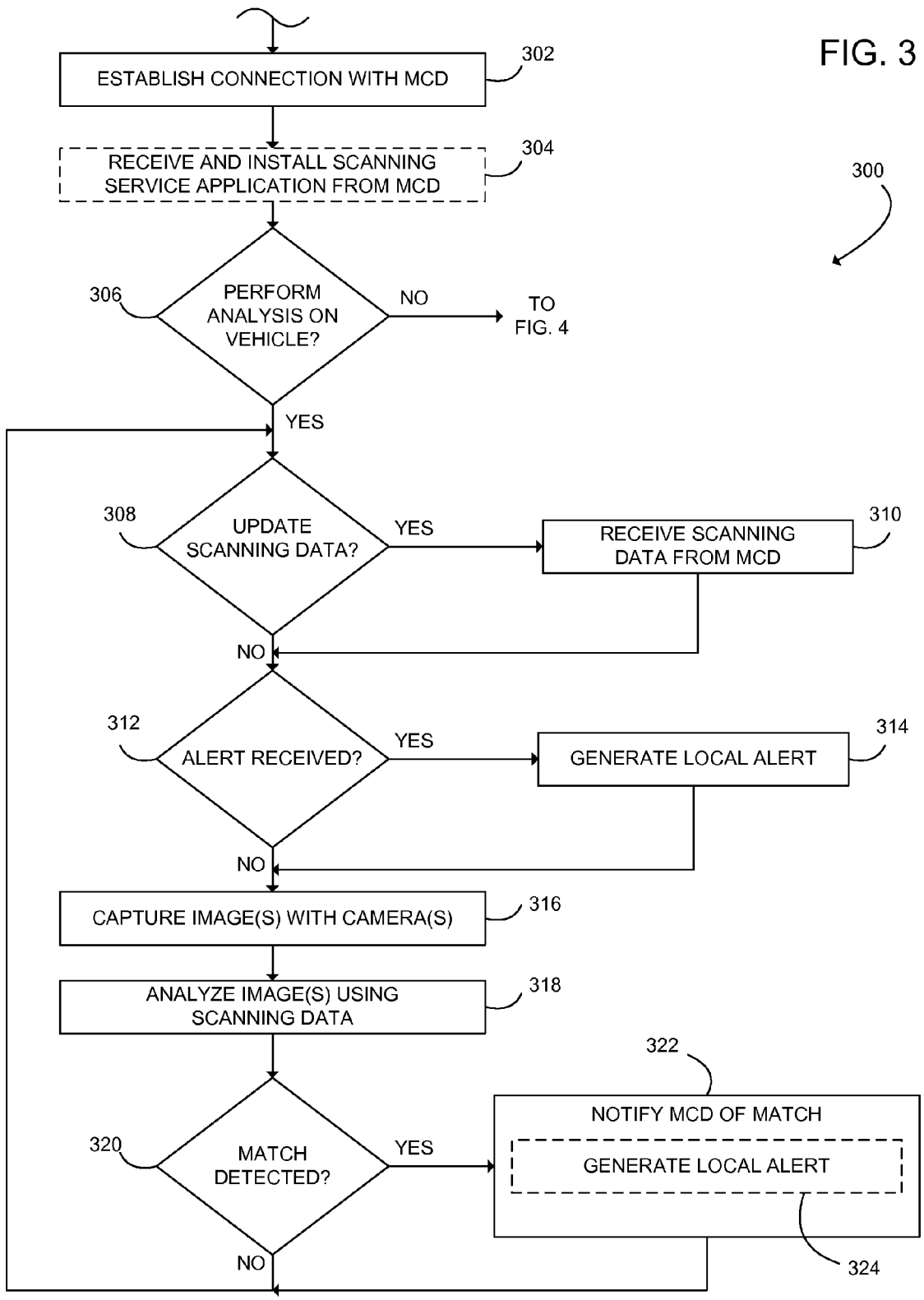
FIGS. 3 and 4 are a simplified flow diagram of at least one embodiment of a method for analyzing captured images using the in-vehicle computing system of the system of FIG. 1.

Referring now to FIG. 3, an illustrative embodiment of a method 300 for analyzing captured images, which may be executed by the in-vehicle computing system 150 of the vehicle 110, begins with block 302. In block 302, the in-vehicle computing system 150 establishes a communication connection with the mobile communication device 102 over the local/personal network 108. As discussed above, in some embodiments, the communication connection may be embodied as a near field communication link, a Bluetooth® communication link, a Wi-Fi® link, and/or other short-range connection. For example, in some embodiments, the in-vehicle computing system 150 and the mobile communication device 102 may utilize a near field communication link to initially establish a secure trust relationship between each other (e.g., to "bind" the mobile communication device 102 to the in-vehicle computing system 150) and subsequently establish a Bluetooth® communication link, a Wi-Fi® link, or other wireless communication link to transfer data between the in-vehicle computing system 150 and the mobile communication device 102. In other embodiments, a single communication link (e.g., a Bluetooth® communication link) may be used to establish the trust relationship and facilitate the data transfer.

In some embodiments, the establishment of a secure trust relationship between the in-vehicle computing system 150 and the mobile communication device 102 may include a cryptographic key session to establish shared cryptographic keys between the system 150 and the device 102. Such cryptographic keys may include symmetric and/or asymmetric key pairs, which may be stored in secure memory locations within each of the in-vehicle computing system 150 and the mobile communication device 102. It should be appreciated that the secure trust relationship may be established between the in-vehicle computing system 150 and the mobile communication device 102 to ensure that no unauthorized mobile device can communicate with the in-vehicle computing system 150 to retrieve images therefrom and/or control the system 150.

In block 304, the in-vehicle computing system 150 may receive and install a scanning service application from the mobile communication device 102. In some embodiments, the mobile communication device 102 may determine whether a current updated version of a particular scanning service application is already installed on the in-vehicle computing system 150. As such, the mobile communication device 102 may only provide the scanning service application to the in-vehicle computing system 150 if it is not already installed. In other embodiments, the scanning service application may already be provisioned into the in-vehicle computing system 150 during manufacture.

In some embodiments, the scanning service application allows the vehicle owner or operator to select preferences and/or policies such as opting-in or opting-out of the service based on a specific location, time, day, and/or other factors. In some embodiments, there is no user involvement other than selecting preferences. Additionally, in some embodiments, the scanning service application is used to interface with the mobile communication device 102 to receive updated scanning data 122 and/or alert notifications from the scanning data server 106. It should be appreciated that the scanning service application may include one or more of the elements of the environment 200 of the in-vehicle computing system 150 discussed in regard to FIG. 2.

In block 306, the in-vehicle computing system 150 determines whether to analyze the images captured by the vehicle-based cameras 160 using the in-vehicle computing system 150. If so, the in-vehicle computing system 150 determines whether to update the scanning data 122 in block 308. In some embodiments, the mobile communication device 102 may notify the in-vehicle computing system 150 when it has downloaded updated scanning data 122 from the scanning data server 106. In other embodiments, in-vehicle computing system 150 may prompt the mobile communication device 102 to retrieve updated scanning data 122 from the scanning data server 106. As such, the in-vehicle computing system 150 may request updated scanning data 122 continuously, periodically, and/or aperiodically. In various embodiments, the scanning data 122 may be updated in any random, chaotic, or ordered set of intervals. The scanning data 122 may also be updated on the in-vehicle computing system 150 in response to atemporal events, such as changes to the scanning data 122 on the scanning data server 106. If the in-vehicle computing system 150 determines to update the scanning data 122, the updated scanning data 122 is received from the mobile communication device in block 310.

In block 312, the in-vehicle computing system 150 determines whether an alert notification has been received from the mobile communication device 102. In some embodiments, the mobile communication device 102 may notify the in-vehicle computing system 150 of any warnings or alerts that the owner or driver of the vehicle 110 has opted to receive. For example, the mobile communication device 102 may alert the in-vehicle computing system 150 if a fugitive's vehicle has been identified in a location near the vehicle 110 or in a popular public location. In some embodiments, the mobile communication device 102 receives such warnings or alerts from the scanning data server 106. In various embodiments, the mobile communication device 102 may transmit theses warnings to the in-vehicle computing system 150, as in block 312, or notify the user via the mobile communication device 102 itself (see, e.g., block 516 of FIG. 5). If the in-vehicle computing system 150 has received an alert from the mobile communication device 102, the in-vehicle computing system 150 may generate a local alert in block 314. For example, the image analysis module 210 may generate an signal output to cause activation of a local alert. Such local alerts may be embodied as any type of alert capable of notifying the driver of the vehicle 110 including, but not limited to, an audible alert, a visual alert, and/or a tactile alert. For example, in some embodiments, the in-vehicle computing system 150 may generate an audio signal corresponding with an appropriate warning message and render it on the speaker 164 of the vehicle 110. In other embodiments, the local alert message may be displayed on the display 162 (e.g., on a center console display or infotainment system display) of the vehicle 110. As discussed above, in some embodiments, the owner or driver of the vehicle 110 may opt-in or opt-out of receiving warnings or alerts by modifying their user preferences or policy. Additionally, in some embodiments, a law enforcement agency associated with a particular scanning service application may establish a policy such that warnings are not provided to the mobile communication device 102 from the scanning data server 106.

In block 316, the in-vehicle computing system 150 captures an image using one of the cameras 160 on the vehicle 110. As discussed above, depending on the intended use, the particular cameras 160 used to capture images may vary in alternative embodiments. The number of images taken with a given camera may also vary as suitable image analysis techniques may require different numbers of images to achieve acceptable results. Additionally, in some embodiments, the images may be captured or produced automatically (e.g., periodically) or in response to a command received by driver or other occupant of the vehicle. In block 318, the in-vehicle computing system 150 analyzes the image(s) with the image analysis module 210 to determine whether there is a match with the scanning data 122. If a match is detected in block 320, the in-vehicle computing device 150 notifies the mobile communication device 102 of the match in block 322. In doing so, the in-vehicle computing device 150 may identify which data of the scanning data 122 is matched. For example, when the scanning data 122 includes reference license plate numbers, the in-vehicle computing device 150 may indicate which of the reference license plate numbers matched the captured image. Additionally, in some embodiments, the in-vehicle computing system 150 may generate a local alert in block 324 indicating to the driver of the vehicle 110, for example, that he or she should drive extra cautiously (e.g., due to a violent felon, potential police vehicle hot pursuit, or other potentially dangerous situation in the driver's vicinity). In alternative embodiments, the local alert may be rendered on the display 162 or speaker 164 of the vehicle 110 as described in reference to block 314. The method 300 returns to block 308 in which the in-vehicle computing system 150 determines whether to update the scanning data 122 and continues to capture images using the camera 160 of the vehicle 110.

Figure 4:
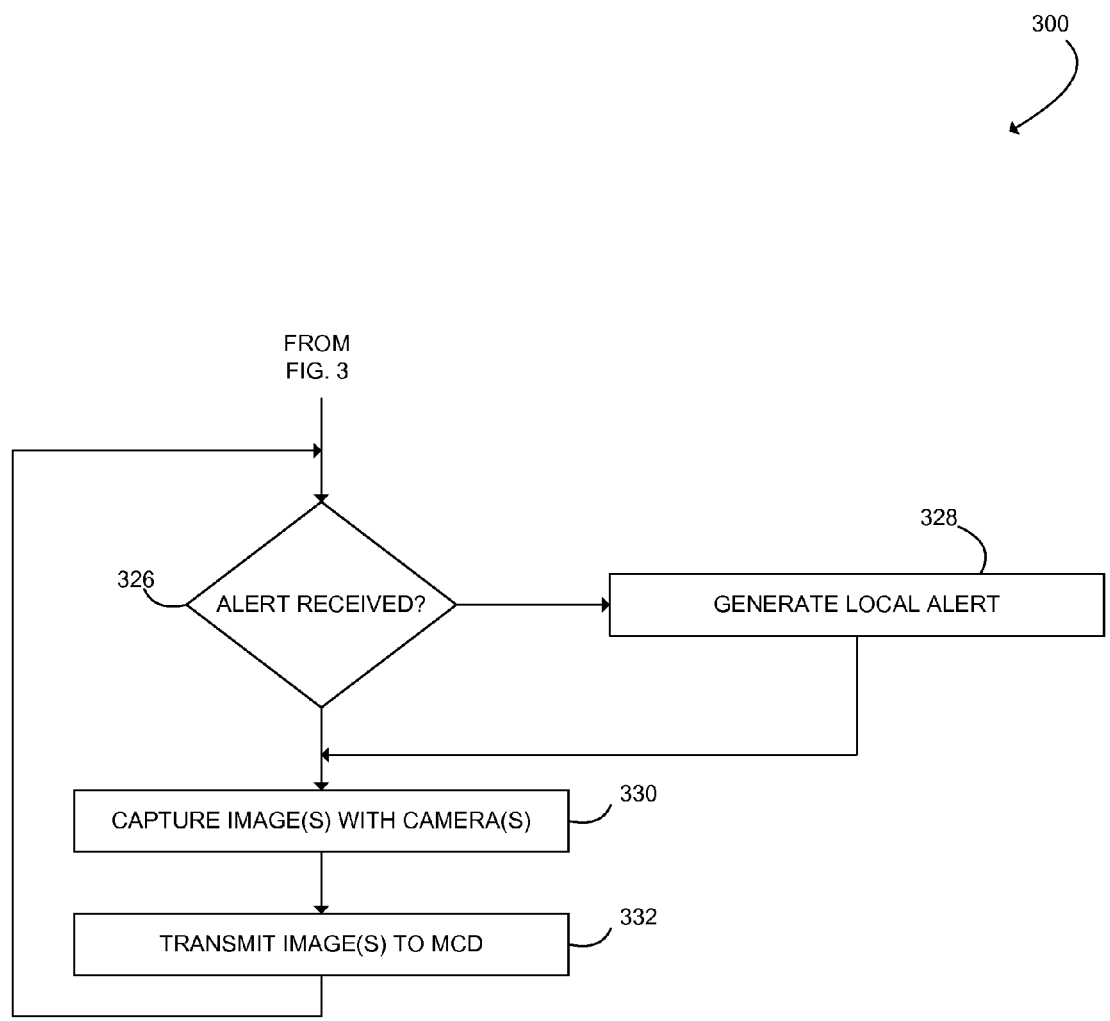

Referring back to block 306, if the in-vehicle computing system 150 determines not to perform the image analysis on the in-vehicle computing system 150 (but instead on the mobile communication device 102), the method 300 advances to block 326 as shown in FIG. 4. In block 326, the in-vehicle computing system 150 determines whether an alert notification has been received from the mobile communication device 102. If so, the in-vehicle computing system 150 may generate and render a local alert message in block 328. In block 330, the in-vehicle computing system 150 captures one or more images using the camera(s) 160 of the vehicle 110. In block 332, the in-vehicle computing system 150 transmits the one or more images to the mobile communication device 102 for analysis. The method 300 returns to block 326 in which the in-vehicle computing system 150 determines whether an alert notification has been received from the mobile communication device 102 and continues to capture images using the camera 160 of the vehicle 110.

Figure 5:
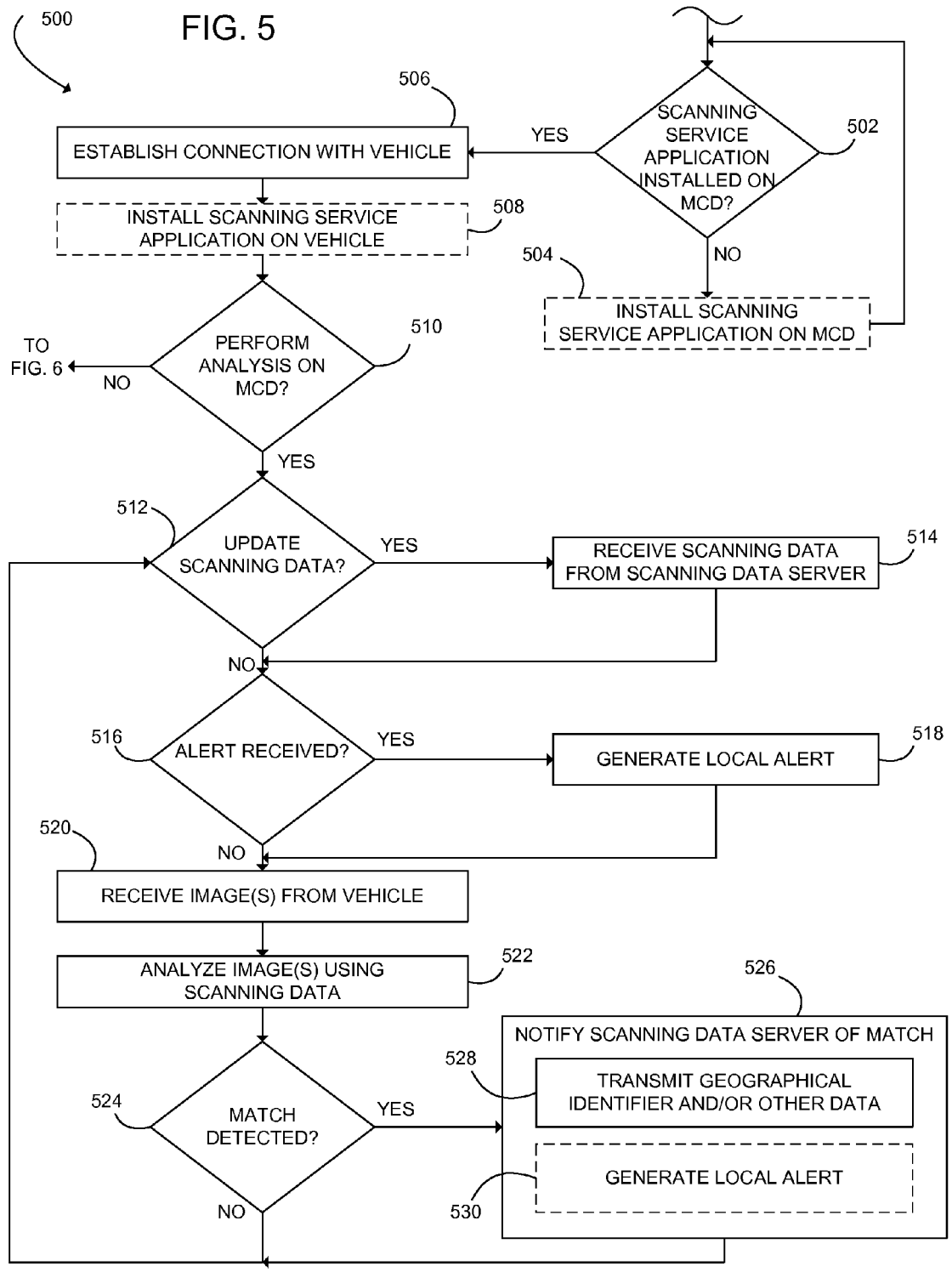
FIGS. 5 and 6 are a simplified flow diagram of at least one embodiment of a method for analyzing images captured by a vehicle-based camera using the mobile communication device of FIG. 1.

Referring now to FIG. 5, one illustrative embodiment of a method 500 for analyzing images captured by a vehicle-based camera, which may be executed by the mobile communication device 102, begins with block 502. In block 502, the mobile communication device 102 determines whether a particular scanning service application is installed on the mobile communication device 102. If not, the mobile communication device 102 may receive and install the scanning service application from the scanning data server 106 or another remote device. In some embodiments, the scanning service application allows the mobile communication device 102 to interface with the scanning data server to retrieve updated scanning data 122, policies associated with scanning service application, and/or alert notifications. Additionally, the scanning service application may be used to interact with the in-vehicle computing system 150 to transmit and/or receive data relevant to the scanning service.

In block 506, the mobile communication device 102 establishes a connection with the in-vehicle computing system 150 over the local/personal network 108. In block 508, the mobile communication device 102 transmits or installs the particular scanning service application on the in-vehicle computing system 150 if it is not already installed. In block 510, the mobile communication device 102 determines whether to perform the image analysis on the mobile communication device 102. If so, then the mobile communication device 102 determines whether to update the scanning data 122 in block 512. In some embodiments, the mobile communication device 102 may retrieve updated scanning data 122 from the scanning data server 106 in response to a directive of the in-vehicle computing system 150. In other embodiments, the mobile communication device 102 may retrieve updated scanning data 122 continuously, periodically, and/or aperiodically; in any random, chaotic, or ordered set of intervals; and/or in response to one or more atemporal event. For example, the mobile communication device 102 may retrieve updated scanning data 122 in response to receiving a notification from the scanning data server 106 indicating, for example, that updated scanning data 122 is available. If the mobile communication device 102 determines to update the scanning data 122, in block 514, the updated scanning data 122 in retrieved from the scanning data server 106 via the network 104.

In block 516, the mobile communication device 102 determines whether an alert notification has been received from the scanning data server 106. As discussed above, in some embodiments, the scanning data server 106 may notify the mobile communication device 102 if, for example, another mobile communication devices participating in the scanning service (i.e., also using the scanning service application) has identified a fugitive's vehicle near the user's vehicle 110. Additionally, in some embodiments, the mobile communication device 102 may be notified if a law enforcement officer identifies a fugitive or fugitive's vehicle near the user's vehicle 110. If an alert is received, in some embodiments, the mobile communication device 102 may generate a local alert message and render the message on the display 124 and/or the speaker 126 of the mobile communication device 102 in block 518. In other embodiments, the mobile communication device 102 may instead transmit the alert notification or the generated alert message to the in-vehicle computing system 150 to be rendered on the display 162 and/or speaker 164 of the vehicle 110. In some embodiments, the mobile communication device 102 may determine whether to render an alert message on the mobile communication device 102 or the vehicle 110 as a function of user preferences. Further, in some embodiments, a particular scanning service application may permit a user to establish and modify their preferences using the display 124 (e.g., a touch screen display) or other I/O components of the mobile communication device 102.

In block 520, the mobile communication device 102 may receive one or more images captured with the camera(s) 160 of the vehicle 110. In block 522, the mobile communication device 102 analyzes the image(s) with the image analysis module 214 to determine whether there is a match with the scanning data 122. If a match is detected in block 524, then the mobile communication device 102 notifies the scanning data server 106 of the match in block 526. In doing so, the notification may specifically indicate which data of the scanning data 122 was matched. Additionally, in some embodiments, the mobile communication device 102 may transmit geographically identifying information and/or other data to the scanning data server 106 included in, along with, or separate from the notification in block 528. That is, the mobile communication device 102 may transmit Global Positioning System ("GPS") data or other location data associated with the location of the mobile communication device 102 to the scanning data server 106. In some embodiments, the notification may also identify a time in which the match was identified and/or other information.

In the embodiment discussed above involving license plate matching, a law enforcement agency may use to the location data to, for example, identify the location of a fugitive and alert nearby law enforcement officers. Additionally, the scanning data server 106 may also alert scanning service participants of a potential danger. In some embodiments, the mobile communication device 102 may also generate a local alert in response to detecting a match in block 530. The method 500 returns to block 512 in which the mobile communication device 102 determines whether to update the scanning data 122.

Figure 6:
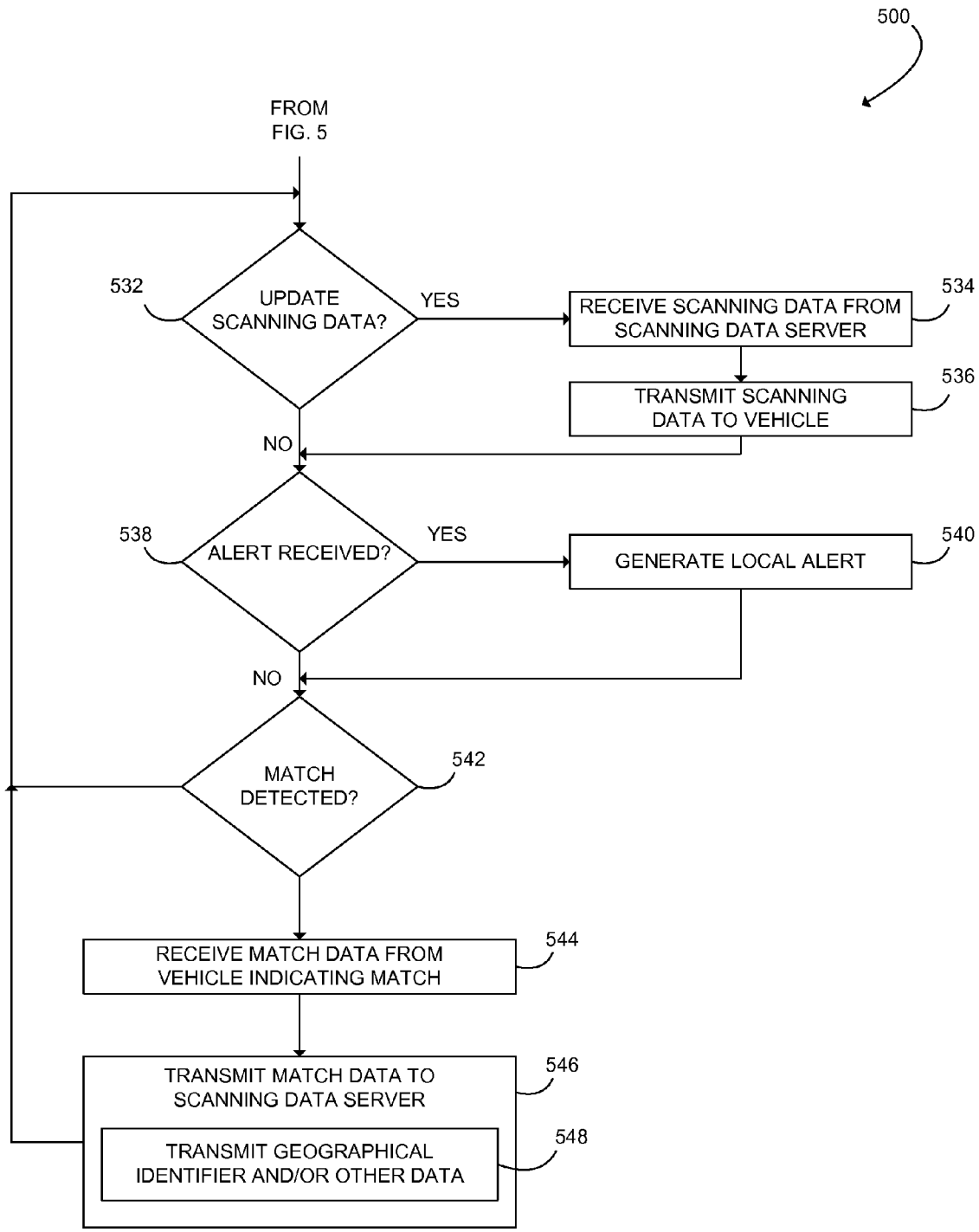

If, in block 510, the mobile communication device 102 determines to perform the image analysis on the in-vehicle computing system 150 rather than on the mobile communication device 102, the method 500 advances to block 532 as shown in FIG. 6. In block 532, the mobile communication device 102 determines whether to update the scanning data 122 in block 532. If so, the mobile communication device 102 retrieves the updated scanning data 122 from the scanning data server 106 in block 534 and transmits the retrieved scanning data 122 to the in-vehicle computing system 150 in block 536. In block 538, the mobile communication device 102 determines whether an alert notification has been received from the scanning data server 106. If so, the mobile communication device 102 may, in some embodiments, generate a local alert message and render the message on the mobile communication device 102 in block 540. In other embodiments, the mobile communication device 102 may transmit the alert notification or the generated alert message to the in-vehicle computing system 150 to be rendered on the vehicle 110.

In block 542, the mobile communication device 102 determines whether the in-vehicle computing system 150 has detected a match between captured images and the scanning data 122. If the in-vehicle-computing system 150 has identified a match, the mobile communication device 102 may receive data indicating the match from the in-vehicle computing system 150 in block 544. As discussed above, the match data may indicate which data of the scanning data 122 was matched (e.g., which reference license plate). In block 546, the mobile communication device 102 may transmit the match data received from the in-vehicle computing system 150 to the scanning data server 106. Additionally, in some embodiments, the mobile communication device 102 may also transmit geographically identifying information and/or other data to the scanning data server 106 in block 548. As discussed above, the geographically identifying information may include GPS data and/or other location data. The method 500 returns to block 532 in which the mobile communication device 102 determines whether to update the scanning data 122.

Figure 7:
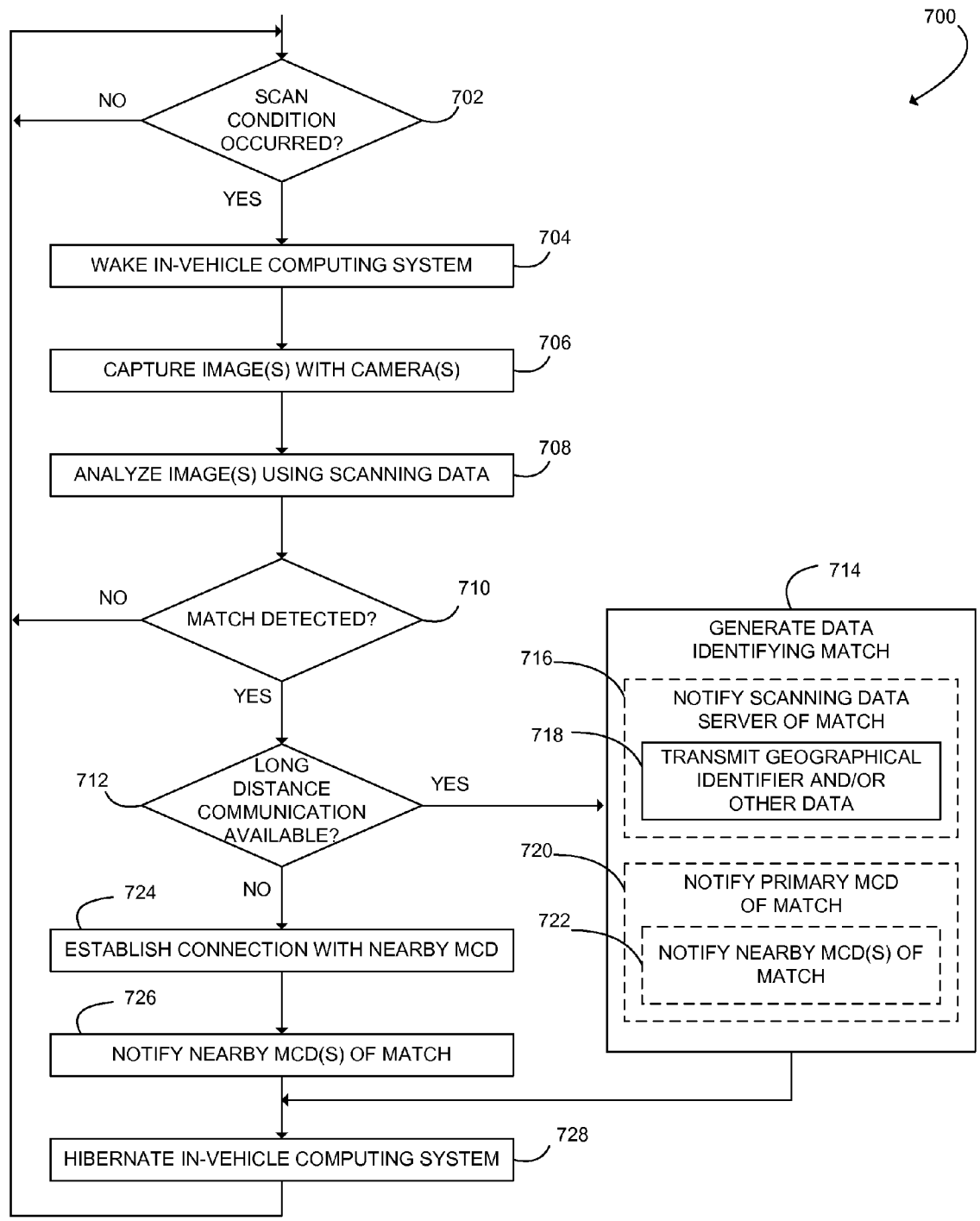
FIG. 7 is a simplified flow diagram of at least one embodiment of a method for waking the in-vehicle computing system of the system of FIG. 1 to analyze captured images.

Referring now to FIG. 7, one illustrative embodiment of a method 700 for waking the in-vehicle computing system of the system of FIG. 1 to analyze captured images, which may be executed by the in-vehicle computing system 150 of the vehicle 110, begins with block 702. In block 702, the in-vehicle computing system 150 determines whether a scan condition has occurred. That is, a scan condition may be established such that its occurrence triggers the scanning procedure. In some embodiments, the scan condition may be expiration of a timer (e.g., for periodic scanning) or in response to sensor data from one or more sensors 170 of the vehicle. For example, the sensors 170 may detect a change in the field of view of the cameras 160 indicating that one or more new objects (e.g., vehicle license plates) may be available for scanning. In another embodiment, the scanning data server 106 may transmit data to the in-vehicle computing system 150 indicating that the scan should be performed.

If the scan condition occurred, the in-vehicle computing system 110 may be awakened in block 704. As such, it should be appreciated that in some embodiments, the in-vehicle computing system 110, the vehicle 110 and/or the in-vehicle computing system 110 may include a low-power co-processor and/or processing element to be executed while the in-vehicle computing system 150 (or the main processor 152 of the in-vehicle computing system 150) is in a sleep state. In other embodiments, one or more components of the in-vehicle computing system 110 may remain powered when the vehicle 110 is powered off. In such embodiments, the in-vehicle computing system 110 may selectively turn off (e.g., automatically power off) under certain conditions (e.g., low vehicle 110 battery power).

In some embodiments, the camera(s) 160 of the vehicle 110 capture one or more images once the in-vehicle computing system 150 is powered on (i.e., operational). As such, in block 706, the in-vehicle computing system 150 may receive the one or more captured images. In block 708, the in-vehicle computing system 150 analyzes the image(s) with the image analysis module 210 to determine whether there is a match with the scanning data 122. If not match is detected, the method 700 returns to block 702 in which the in-vehicle computing system 150 waits until another scan condition occurs. Additionally, in some embodiments, one or more components of the in-vehicle computing system 150 is placed in a hibernation, sleep, or powered off state if no match is detected.

If a match is detected, however, the in-vehicle computing system 150 determines whether long distance communication circuitry is available in block 712. That is, the in-vehicle computing system 150 determines whether the communication circuit 158 includes long distance communication circuitry. If long distance communication circuitry is available, the in-vehicle computing system 150 may generate data identifying the match in block 714. For example, if the scanning data 122 are reference license plates, the data may indicate which license plate number was matched. In block 716, the in-vehicle computing system 150 may notify the scanning data server 106 of the match. In doing so, the in-vehicle computing system 150 may transmit the generated match data (i.e., the data indicating which data of the scanning data 122 was matched). Additionally, in some embodiments, the in-vehicle computing system 150 may transmit geographically identifying information and/or other data to the scanning data server 106 in block 718. In some embodiments, in block 720, the in-vehicle computing system 150 may notify the mobile communication device 102 of the match so as to alert the user of a potential danger. That is, the in-vehicle computing system 150 may notify one or more user's of the in-vehicle computing system 150 (e.g., the owner or primary driver of the vehicle 110). In some embodiments, the in-vehicle computing system 150 may additionally or alternatively notify nearby mobile communication devices of the match as well. Thereafter, the in-vehicle computing system 150 may be placed back in a hibernation, low power, sleep, or powered off state in block 728.

Returning to block 712, if the in-vehicle computing system 150 determines that long distance communication circuitry is unavailable (i.e., the communication circuit 158 includes only short-range communication circuitry), then the in-vehicle computing system 150 may establish a connection with one or more nearby mobile communication devices. That is, the in-vehicle communication system 150 may establish a short-range communication connection with one or more mobile communication devices different from the primary mobile communication device 102 (i.e., the primary mobile communication device 102 being one that belongs to a user, owner, or primary driver of the vehicle 110 as discussed above). As discussed above, in some embodiments, the short-range communication connection may be embodied as a near field communication link, a Bluetooth® communication link, a Wi-Fi® link, and/or other short-range connection. Further, in some embodiments, the nearby mobile communication device(s) must have authorization in order to establish the communication link with the in-vehicle computing system 150. For example, in some embodiments, the user of the in-vehicle computing system 150 may establish a preference within the scanning service application indicating that other nearby mobile communication devices using the scanning service application may access the in-vehicle computing system 150 for certain authorized uses.

In block 726, the in-vehicle computing system 150 may notify the nearby mobile communication device(s) of the match. In some embodiments, the in-vehicle computing system 150 may transmit geographically identifying information or other data to the nearby mobile communication device(s). However, it should be appreciated that in some embodiments, geographically identifying information is not transmitted because, due to the transmission distance limitations of short-range communication, the nearby mobile communication device(s) have the same approximate location as the in-vehicle computing system 150 and therefore the same approximate location as the target corresponding with the matched scanning data 122. In some embodiments, the nearby mobile communication device(s) may then notify the scanning data server 106 of the match and provide geographically identifying information to the scanning data server 106. In block 728, the in-vehicle computing system 150 may be placed in a hibernation state. The method 700 then returns to block 702 in which the in-vehicle computing system 150 waits until another scan condition occurs. In another embodiment, the scanning data server 106 may send a transmission to the in-vehicle computing system 150 causing it to wake from the sleep state, capture one or images using the camera(s) 160, transmit the captured image(s) to the scanning data server 106 for analysis, and return to the sleep state. It should be appreciated that, in some embodiments, the method 700 may be executed when the driver of the vehicle 110 is away and the vehicle 110 is parked, for example.

EXAMPLES

Illustrative examples of the devices, systems, and methods disclosed herein are provided below. An embodiment of the devices, systems, and methods may include any one or more, and any combination of, the examples described below.

Example 1 includes an in-vehicle computing system for analyzing captured images. The in-vehicle computing system includes a camera; an image capturing module to capture at least one image using the camera; a communication module to (i) establish a communication connection with a mobile communication device and (ii) receive scanning data from the mobile communication device, the scanning data identifying one or more reference vehicle license plates; and an image analysis module to (i) analyze the at least one image as a function of the scanning data and (ii) transmit a notification, using the communication module, to the mobile communication device in response to identifying a match between the scanning data and the at least one image.

Example 2 includes the subject matter of Example 1, and wherein the communication module comprises at least one of: a near field communication circuitry, a Bluetooth® communication circuit, and a Wi-Fi® communication circuit.

Example 3 includes the subject matter of any of Examples 1 and 2, and wherein the scanning data identifies one or more reference vehicle license plate numbers.

Example 4 includes the subject matter of any of Examples 1-3, and wherein the scanning data comprises one or more images of reference vehicle license plates.

Example 5 includes the subject matter of any of Examples 1-4, and wherein the image analysis module is to analyze the at least one image by comparing the at least one image to the one or more images of the reference vehicle license plates.

Example 6 includes the subject matter of any of Examples 1-5, and wherein the camera is a rearview back-up camera of the vehicle.

Example 7 includes the subject matter of any of Examples 1-6, and wherein the communication module is to receive alert message data from the mobile communication device; and the image analysis module is to generate a local alert as a function of the alert message data.

Example 8 includes the subject matter of any of Examples 1-7, and further includes at least one of a speaker and a display; and the image analysis module is to generate a local alert on at least one of the speaker and display.

Example 9 includes the subject matter of any of Examples 1-8, and wherein the image analysis module is to generate a local alert in response to the image analysis module identifying the match between the scanning data and the image.

Example 10 includes the subject matter of any of Examples 1-9, and wherein in response to the communication module establishing the communication with the mobile communication device the communication module is to receive a scanning service application from the mobile communication device to be subsequently installed on the in-vehicle computing system.

Example 11 includes a mobile communication device for analyzing images from a vehicle-based camera on a mobile communication device. The mobile communication device includes a communication module to (i) establish a communication connection with an in-vehicle computing system of a vehicle, (ii) receive scanning data from a scanner data server, the scanning data identifying one or more reference vehicle license plates and (iii) receive at least one image from the in-vehicle computing system; and an image analysis module to (i) analyze the at least one image as a function of the scanning data and (ii) transmit a notification, using the communication module, to the scanning data server in response to identifying a match between the scanning data and the at least one image; wherein the notification identifies the match and a location of the mobile communication device.

Example 12 includes the subject matter of Example 11, and wherein the communication module comprises at least one of: a near field communication circuitry, a Bluetooth® communication circuit, and a Wi-Fi® communication circuit.

Example 13 includes the subject matter of any of Examples 11 and 12, and wherein the scanning data identifies one or more reference vehicle license plate numbers.

Example 14 includes the subject matter of any of Examples 11-13, and wherein the scanning data comprises one or more images of reference vehicle license plates.

Example 15 includes the subject matter of any of Examples 11-14, and wherein the image analysis module is to analyze the at least one image by comparing the at least one image to the one or more images of the reference vehicle license plates.

Example 16 includes the subject matter of any of Examples 11-15, and wherein the at least one image was generated by a rearview back-up camera of the vehicle.

Example 17 includes the subject matter of any of Examples 11-16, and wherein the location is identified by global positioning system data of the mobile communication device.

Example 18 includes the subject matter of any of Examples 11-17, and wherein the notification indicates a time in which the match was identified.

Example 19 includes the subject matter of any of Examples 11-18, and wherein the communication module is to receive alert message data from the scanning data server.

Example 20 includes the subject matter of any of Examples 11-19, and wherein the communication module is to transmit the alert message data to the in-vehicle computing system.

Example 21 includes the subject matter of any of Examples 11-20, and wherein the image analysis module is to generate a local alert message as a function of the alert message data.

Example 22 includes the subject matter of any of Examples 11-21, and further includes at least one of: a speaker and a display; and the image analysis module is to generate a local alert on at least one of the speaker and display.

Example 23 includes the subject matter of any of Examples 11-22, and wherein the image analysis module is to generate a local alert message in response to the image analysis module identifying the match between the scanning data and the at least one image.

Example 24 includes the subject matter of any of Examples 11-23, and wherein the communication module is to transmit alert message data to the in-vehicle computing system in response to the image analysis module identifying the match between the scanning data and the at least one image.

Example 25 includes a method for analyzing captured images on an in-vehicle computing system of a vehicle. The method includes establishing, using the in-vehicle computing system, a communication connection with a mobile communication device; receiving, with the in-vehicle computing system, scanning data from the mobile communication device, the scanning data identifying one or more reference vehicle license plates; capturing, with a camera of the vehicle, an image of a license plate of another vehicle; analyzing, using the in-vehicle computing system, the captured image as a function of the scanning data; and transmitting, from the in-vehicle computing system, a notification to the mobile communication device in response to identifying a match between the scanning data and the captured image.

Example 26 includes the subject matter of Example 25, and wherein establishing the communication connection comprises establishing at least one of: a near field communication link, a Bluetooth® communication link, and a Wi-Fi® communication link.

Example 27 includes the subject matter of any of Examples 25 and 26, and wherein receiving the scanning data comprises receiving scanning data identifying one or more reference vehicle license plate numbers.

Example 28 includes the subject matter of any of Examples 25-27, and wherein receiving the scanning data comprises receiving one or more images of reference vehicle license plates.

Example 29 includes the subject matter of any of Examples 25-28, and wherein analyzing the image comprises comparing the image to the one or more images of the reference vehicle license plates.

Example 30 includes the subject matter of any of Examples 25-29, and wherein capturing the image of the license plate of another vehicle comprises capturing an image using a rearview back-up camera of the vehicle.

Example 31 includes the subject matter of any of Examples 25-30, and further includes receiving, with the in-vehicle computing system, alert message data from the mobile communication device; and generating, with the in-vehicle computing system, a local alert message as a function of the alert message data.

Example 32 includes the subject matter of any of Examples 25-31, and wherein generating a local alert message comprises rendering the local alert message on a speaker or display of the vehicle.

Example 33 includes the subject matter of any of Examples 25-32, and further includes generating, on the in-vehicle computing system, a local alert message in response to identifying the match between the scanning data and the image.

Example 34 includes the subject matter of any of Examples 25-23, and further includes, in response to establishing the communication connection with the mobile communication device: receiving, with the in-vehicle computing system, a scanning service application from the mobile communication device; and installing, on the in-vehicle computing system, the scanning service application.

Example 35 includes a computing device having a processor and a memory having stored therein a plurality of instructions that when executed by the processor cause the computing device to perform the method of any of Examples 25-34.

Example 36 includes one or more machine readable storage media comprising a plurality of instructions stored thereon that in response to being executed result in a computing device performing the method of any of Examples 25-34.

Example 37 includes a method for analyzing images generated by a vehicle-based camera on a mobile communication device. The method includes establishing, using the mobile communication device, a communication connection with an in-vehicle computing system of a vehicle; receiving, with the mobile communication device, scanning data from a scanning data server, the scanning data identifying one or more reference vehicle license plates; receiving, with the mobile communication device, an image of a license plate of another vehicle from the in-vehicle computing system, the image being generated by a camera of the vehicle; analyzing, using the mobile communication device, the image as a function of the scanning data; and transmitting, from the mobile communication device, a notification to the scanning data server, in response to identifying a match between the scanning data and the image, identifying the match and a location of the mobile communication device.

Example 38 includes the subject matter of Example 37, and wherein establishing the communication connection comprises establishing at least one of: a near field communication link, a Bluetooth® communication link, and a Wi-Fi® communication link.

Example 39 includes the subject matter of any of Examples 37 and 38, and wherein receiving the scanning data comprises receiving scanning data identifying one or more reference vehicle license plate numbers.

Example 40 includes the subject matter of any of Examples 37-39, and wherein receiving the scanning data comprises receiving one or more images of reference vehicle license plates.

Example 41 includes the subject matter of any of Examples 37-40, and wherein analyzing the image comprises comparing the image to the one or more images of the reference vehicle license plates.

Example 42 includes the subject matter of any of Examples 37-41, and wherein receiving the image comprises receiving an image of a license plate of another vehicle that was generated by a rearview back-up camera of the vehicle.

Example 43 includes the subject matter of any of Examples 37-42, and wherein transmitting the notification identifying the location of the mobile communication device comprises transmitting a notification including global positioning system data of the mobile communication device.

Example 44 includes the subject matter of any of Examples 37-43, and wherein transmitting the notification further comprises transmitting a notification indicating a time in which the match was identified.

Example 45 includes the subject matter of any of Examples 37-44, and further includes receiving, with the mobile communication device, alert message data from the scanning data server.

Example 46 includes the subject matter of any of Examples 37-45, and further includes transmitting, with the mobile communication device, the alert message data to the in-vehicle computing system.

Example 47 includes the subject matter of any of Examples 37-46, and further includes generating, on the mobile communication device, a local alert message as a function of the alert message data.

Example 48 includes the subject matter of any of Examples 37-47, and wherein generating the local alert message comprises rendering a local alert message on a speaker or display of the mobile communication device.

Example 49 includes the subject matter of any of Examples 37-48, and further includes generating, on the mobile computing device, a local alert message in response to identifying the match between the scanning data and the image.

Example 50 includes the subject matter of any of Examples 37-49, and further includes transmitting, with the mobile computing device, alert message data to the in-vehicle computing system in response to identifying the match between the scanning data and the image.

Example 51 includes a computing device having a processor and a memory having stored therein a plurality of instructions that when executed by the processor cause the computing device to perform the method of any of Examples 37-50.

Example 52 includes one or more machine readable storage media comprising a plurality of instructions stored thereon that in response to being executed result in a computing device performing the method of any of Examples 37-50.

Example 53 includes a scanning data server for distributing scanning data, the data server comprising a memory to store scanning data and a communication module to (i) establish a wireless communication connection with a computing device, (ii) transmit at least a portion of the scanning data to the computing device, and (iii) receive a notification from the computing device identifying a match between the scanning data and at least one image taken by a vehicle-based camera.

Example 54 includes the subject matter of Example 53, and wherein the communication module comprises cellular communication circuitry.

Example 55 includes the subject matter of any of Examples 53 and 54, and wherein the scanning data identifies at least one reference vehicle license plate number.

Example 56 includes the subject matter of any of Examples 53-55, and wherein the scanning data comprises an image of at least one reference vehicle license plate.

Example 57 includes the subject matter of any of Examples 53-56, and wherein the computing device comprises one of: a mobile communication device and an in-vehicle computing system.

Example 58 includes a method for distributing scanning data from a scanning data server. The method includes establishing, using the scanning data server, a wireless communication connection with a computing device; transmitting, using the scanning data server, scanning data to the computing device; and receiving, with the scanning data server, a notification from the computing device identifying a match between the scanning data and at least one image taken by a vehicle-based camera.

Example 59 includes the subject matter of Example 58, and wherein establishing the wireless communication connection comprises establishing a cellular communication connection.

Example 60 includes the subject matter of any of Examples 58 and 59, and wherein transmitting the scanning data comprises transmitting at least one reference vehicle license plate number.

Example 61 includes the subject matter of any of Examples 58-60, and wherein transmitting the scanning data comprises transmitting an image of at least one reference vehicle license plate.

Example 62 includes the subject matter of any of Examples 58-61, and wherein establishing the wireless communication connection comprises establishing a wireless communication connection with one of: a mobile communication device and an in-vehicle computing system.

Example 63 includes a computing device comprising a processor and a memory having stored therein a plurality of instructions that when executed by the processor cause the computing device to perform the method of any of Examples 58-62.

Example 64 includes one or more machine readable storage media comprising a plurality of instructions stored thereon that in response to being executed result in a computing device performing the method of any of Examples 58-62.

Example 65 includes a mobile communication device for forwarding match data to a scanning data server. The mobile communication device includes a communication module to (i) establish a first wireless communication connection with an in-vehicle computing system of a vehicle, (ii) receive the match data from the in-vehicle computing system in response to the in-vehicle computing system identifying a match between scanning data and an image captured by a camera of the vehicle, (iii) establish a second wireless communication connection with the scanning data server, and (iv) transmitting the match data to the scanning data server.

Example 66 includes the subject matter of Example 65, and wherein the communication module comprises long-range communication circuitry and at least one of a near field communication circuitry, a Bluetooth® communication circuit, and a Wi-Fi® communication circuit; and the communication module is to establish the first wireless communication connection using the at least one of a near field communication circuitry, a Bluetooth® communication circuit, and a Wi-Fi® communication circuit and establish the second wireless communication connection using the long-range communication circuitry.

Example 67 includes the subject matter of any of Examples 65 and 66, and wherein the scanning data identifies at least one reference vehicle license plate number.

Example 68 includes the subject matter of any of Examples 65-67, and wherein the scanning data comprises an image of at least one reference vehicle license plate.

Example 69 includes a method for forwarding match data to a scanning data server with a mobile communication device. The method includes establishing, using the mobile communication device, a first wireless communication connection with an in-vehicle computing system of a vehicle; receiving, with the mobile communication device, the match data from the in-vehicle computing system in response to the in-vehicle computing system identifying a match between scanning data and an image captured by a camera of the vehicle; establishing, using the mobile communication device, a second wireless communication connection with the scanning data server; and transmitting, from the mobile communication device, the match data to the scanning data server.

Example 70 includes the subject matter of Example 69, wherein establishing the first wireless communication connection comprises establishing a first wireless communication connection using at least one of a near field communication circuitry, a Bluetooth® communication circuit, and a Wi-Fi® communication circuit; and establishing the second wireless communication connection comprises establishing a second wireless communication connection using the long-range communication circuitry.

Example 71 includes the subject matter of any of Examples 69 and 70, and wherein receiving the match data comprises receiving the match data from the in-vehicle computing system in response to the in-vehicle computing system identifying a match between at least one reference vehicle license plate number and an image captured by a camera of the vehicle.

Example 72 includes the subject matter of any of Examples 69-70, and wherein receiving the match data comprises receiving the match data from the in-vehicle computing system in response to the in-vehicle computing system identifying a match between an image of at least one reference vehicle license plate and an image captured by a camera of the vehicle.

Example 73 includes a computing device having a processor and a memory having stored therein a plurality of instructions that when executed by the processor cause the computing device to perform the method of any of Examples 69-72.

Example 74 includes one or more machine readable storage media comprising a plurality of instructions stored thereon that in response to being executed result in a computing device performing the method of any of Examples 69-72.

Example 75 includes an in-vehicle computing system for analyzing captured images. The in-vehicle computing system includes means for establishing a communication connection with a mobile communication device; means for receiving scanning data from the mobile communication device, the scanning data identifying one or more reference vehicle license plates; means for capturing an image of a license plate of another vehicle; means for analyzing the captured image as a function of the scanning data; and means for transmitting a notification to the mobile communication device in response to identifying a match between the scanning data and the captured image.

Example 76 includes the subject matter of Example 75, and wherein the means for establishing the communication connection comprises means for establishing at least one of: a near field communication link, a Bluetooth® communication link, and a Wi-Fi® communication link.

Example 77 includes the subject matter of any of Examples 75 and 76, and wherein the means for receiving the scanning data comprises means for receiving scanning data identifying one or more reference vehicle license plate numbers.

Example 78 includes the subject matter of any of Examples 75-77, and wherein the means for receiving the scanning data comprises means for receiving one or more images of reference vehicle license plates.

Example 79 includes the subject matter of any of Examples 75-78, and wherein the means for analyzing the image comprises means for comparing the image to the one or more images of the reference vehicle license plates.

Example 80 includes the subject matter of any of Examples 75-79, and wherein the means for capturing the image of the license plate of another vehicle comprises means for capturing an image using a rearview back-up camera of the vehicle.

Example 81 includes the subject matter of any of Examples 75-80, and further comprising means for receiving alert message data from the mobile communication device and means for generating a local alert message as a function of the alert message data.

Example 82 includes the subject matter of any of Examples 75-81, and wherein the means for generating a local alert message comprises means for rendering the local alert message on a speaker or display of the vehicle.

Example 83 includes the subject matter of any of Examples 75-82, and further comprising means for generating a local alert message in response to identifying the match between the scanning data and the image.

Example 84 includes the subject matter of any of Examples 75-83, and further comprising means for receiving, in response to establishing the communication connection with the mobile communication device, a scanning service application from the mobile communication device and means for installing, in response to establishing the communication connection with the mobile communication device, the scanning service application.

Example 75 includes a mobile communication device for analyzing images generated by a vehicle-based camera. The mobile communication device comprises means for establishing a communication connection with an in-vehicle computing system of a vehicle; means for receiving scanning data from a scanning data server, the scanning data identifying one or more reference vehicle license plates; means for receiving an image of a license plate of another vehicle from the in-vehicle computing system, the image being generated by a camera of the vehicle; means for analyzing the image as a function of the scanning data; and means for transmitting a notification to the scanning data server, in response to identifying a match between the scanning data and the image, identifying the match and a location of the mobile communication device.

Example 76 includes the subject matter of Example 75, and wherein the means for establishing the communication connection comprises means for establishing at least one of: a near field communication link, a Bluetooth® communication link, and a Wi-Fi® communication link.

Example 77 includes the subject matter of any of Examples 75 and 76, and wherein the means for receiving the scanning data comprises means for receiving scanning data identifying one or more reference vehicle license plate numbers.

Example 78 includes the subject matter of any of Examples 75-77, and wherein the means for receiving the scanning data comprises means for receiving one or more images of reference vehicle license plates.

Example 79 includes the subject matter of any of Examples 75-78, and wherein the means for analyzing the image comprises means for comparing the image to the one or more images of the reference vehicle license plates.

Example 80 includes the subject matter of any of Examples 75-79, and wherein the means for receiving the image comprises means for receiving an image of a license plate of another vehicle that was generated by a rearview back-up camera of the vehicle.

Example 81 includes the subject matter of any of Examples 75-80, and wherein the means for transmitting the notification identifying the location of the mobile communication device comprises means for transmitting a notification including global positioning system data of the mobile communication device.

Example 82 includes the subject matter of any of Examples 75-81, and wherein the means for transmitting the notification further comprises means for transmitting a notification indicating a time in which the match was identified.

Example 83 includes the subject matter of any of Examples 75-82, and further comprising means for receiving alert message data from the scanning data server.

Example 84 includes the subject matter of any of Examples 75-83, and further comprising means for transmitting the alert message data to the in-vehicle computing system.

Example 85 includes the subject matter of any of Examples 75-84, and further comprising means for generating a local alert message as a function of the alert message data.

Example 86 includes the subject matter of any of Examples 75-85, and wherein the means for generating the local alert message comprises means for rendering a local alert message on a speaker or display of the mobile communication device.

Example 87 includes the subject matter of any of Examples 75-86, and further comprising generating a local alert message in response to identifying the match between the scanning data and the image.

Example 88 includes the subject matter of any of Examples 75-87, and further comprising means for transmitting alert message data to the in-vehicle computing system in response to identifying the match between the scanning data and the image.

Example 89 includes a scanning data server for distributing scanning data. The scanning data server comprises means for establishing a wireless communication connection with a computing device; means for transmitting scanning data to the computing device; and means for receiving a notification from the computing device identifying a match between the scanning data and at least one image taken by a vehicle-based camera.

Example 90 includes the subject matter of Example 89, and wherein the means for establishing the wireless communication connection comprises means for establishing a cellular communication connection.

Example 91 includes the subject matter of any of Examples 89 and 90, and wherein the means for transmitting the scanning data comprises means for transmitting at least one reference vehicle license plate number.

Example 92 includes the subject matter of any of Examples 89-91, and wherein the means for transmitting the scanning data comprises means for transmitting an image of at least one reference vehicle license plate.

Example 93 includes the subject matter of any of Examples 89-92, and wherein the means for establishing the wireless communication connection comprises means for establishing a wireless communication connection with one of: a mobile communication device and an in-vehicle computing system.

Example 94 includes a mobile communication device for forwarding match data to a scanning data server. The mobile communication device comprises means for establishing a first wireless communication connection with an in-vehicle computing system of a vehicle; means for receiving the match data from the in-vehicle computing system in response to the in-vehicle computing system identifying a match between scanning data and an image captured by a camera of the vehicle; means for establishing a second wireless communication connection with the scanning data server; and means for transmitting the match data to the scanning data server.

Example 95 includes the subject matter of Example 94, and wherein the means for establishing the first wireless communication connection comprises means for establishing a first wireless communication connection using at least one of a near field communication circuitry, a Bluetooth® communication circuit, and a Wi-Fi® communication circuit; and the means for establishing the second wireless communication connection comprises means for establishing a second wireless communication connection using the long-range communication circuitry.

Example 96 includes the subject matter of any of Examples 94 and 95, and wherein means for receiving the match data comprises means for receiving the match data from the in-vehicle computing system in response to the in-vehicle computing system identifying a match between at least one reference vehicle license plate number and an image captured by a camera of the vehicle.

Example 97 includes the subject matter of any of Examples 94-96, and wherein means for receiving the match data comprises means for receiving the match data from the in-vehicle computing system in response to the in-vehicle computing system identifying a match between an image of at least one reference vehicle license plate and an image captured by a camera of the vehicle.

The invention claimed is:

1. An in-vehicle computing system for analyzing captured images, the in-vehicle computing system comprising:
   a camera;
   a main processor;
   a non-critical task processor different from the main processor;
   a short-distance communication circuitry;
   a long-distance communication circuitry;
   an image capturing module to capture at least one image using the camera;
   a communication module to (i) establish a communication connection with a mobile communication device via the short-distance communication circuitry and (ii) receive scanning data from the mobile communication device, the scanning data to identify one or more reference vehicle license plates; and
   an image analysis module to analyze, by the non-critical task processor, the at least one image as a function of the scanning data;
   wherein the communication module is further to (i) determine whether the long-distance communication circuitry is available to the in-vehicle computing system to communicate with a security server, (ii) transmit a notification, using the long-distance communication circuitry, to the security server in response to an identification of a match between the scanning and the captured image and a determination that the long-distance communication circuitry is available, and (iii) transmit a notification, using the short-distance communication circuitry, to the mobile communication device in response to an identification of a match between the scanning data and the at least one image and a determination that the long-distance communication circuitry is unavailable.

2. The in-vehicle computing system of claim 1, wherein the communication module comprises at least one of: a near field communication circuitry, a Bluetooth® communication circuit, and a Wi-Fi® communication circuit.

3. The in-vehicle computing system of claim 1, wherein the scanning data identifies one or more reference vehicle license plate numbers.

4. The in-vehicle computing system of claim 1, wherein the scanning data comprises one or more images of reference vehicle license plates.

5. The in-vehicle computing system of claim 4, wherein the image analysis module is to analyze the at least one image by comparing the at least one image to the one or more images of the reference vehicle license plates.

6. The in-vehicle computing system of claim 1, wherein the camera is at least one of: a rearview back-up camera of the vehicle and a front-facing camera of the vehicle.

7. The in-vehicle computing system of claim 1, wherein:
   the communication module is to receive alert message data from the mobile communication device; and
   the image analysis module is to generate a local alert as a function of the alert message data.

8. The in-vehicle computing system of claim 7, further comprising:
   at least one of: a speaker and a display; and
   the image analysis module is to generate a local alert on at least one of the speaker and display.

9. The in-vehicle computing system of claim 1, the image analysis module is to generate a local alert in response to the image analysis module identifying the match between the scanning data and the image.

10. The in-vehicle computing system of claim 1, wherein in response to the communication module establishing the communication with the mobile communication device:
   the communication module is to receive a scanning service application from the mobile communication device to be subsequently installed on the in-vehicle computing system.

11. One or more non-transitory machine-readable storage media comprising a plurality of instructions stored thereon that, in response to execution by a computing device cause the computing device to:
- establish a communication connection with a mobile communication device via a short-distance communication circuitry;
- receive scanning data from the mobile communication device, the scanning data to identify one or more reference vehicle license plates;
- capture, with a camera coupled the computing device, an image of a license plate of another vehicle;
- analyze the captured image as a function of the scanning data;
- determine whether a long-distance communication circuitry is available to the computing device to communicate with a security server;
- transmit a notification of a match between the scanning data and the captured image, via the long-distance communication circuitry, to the security server in response to (i) an identification of a match between the scanning data and the captured image and (ii) a determination that the long-distance communication circuitry is available; and
- transmit the notification, via the short-distance communication circuitry, to the mobile communication device in response to (i) an identification of a match between the scanning data and the captured image and (ii) a determination that the long-distance communication circuitry is unavailable.

12. The one or more non-transitory machine-readable storage media of claim 11, wherein to establish the communication connection comprises to establish at least one of: a near field communication link, a Bluetooth® communication link, and a Wi-Fi® communication link.

13. The one or more non-transitory machine-readable storage media of claim 11, wherein to receive the scanning data comprises to receive scanning data to identify one or more reference vehicle license plate numbers.

14. The one or more non-transitory machine-readable storage media of claim 11, wherein to receive the scanning data comprises to receive one or more images of reference vehicle license plates.

15. The one or more non-transitory machine-readable storage media of claim 11, wherein the plurality of instructions further cause the computing device to:
- receive alert message data from the mobile communication device; and
- generate a local alert message as a function of the alert message data.

16. The one or more non-transitory machine-readable storage media of claim 15, wherein to generate a local alert message comprises to render the local alert message on a speaker or display of the vehicle.

17. The one or more non-transitory machine-readable storage media of claim 11, wherein the plurality of instructions further cause the computing device to generate a local alert message in response to identification of the match between the scanning data and the image.

18. The one or more non-transitory machine-readable storage media of claim 11, wherein the plurality of instructions further cause the computing device, in response to establishment of the communication connection with the mobile communication device to:
- receive a scanning service application from the mobile communication device; and
- install the scanning service application.

19. A method for analyzing captured images on an in-vehicle computing system of a vehicle, the method comprising:
- establishing, by the in-vehicle computing system, a communication connection with a mobile communication device via a short-distance communication circuitry;
- receiving, with the in-vehicle computing system, scanning data from the mobile communication device, the scanning data identifying one or more reference vehicle license plates;
- capturing, with a camera of the vehicle, an image of a license plate of another vehicle;
- analyzing, using a non-critical task processor of the in-vehicle computing system, the captured image as a function of the scanning data;
- determining, by the in-vehicle computing system, whether a long-distance communication circuitry is available to the in-vehicle computing system to communication with a security server;
- transmitting, from the in-vehicle computing system, a notification to the security server via the long-distance communication circuitry in response to (i) identifying a match between the scanning data and the captured image and (ii) determining that the long-distance communication circuitry is available; and
- transmitting, from the in-vehicle computing system, a notification to the mobile communication device via the short-distance communication circuitry in response to (i) identifying a match between the scanning data and the captured image and (ii) determining that the long-distance communication circuitry is unavailable.

20. The method of claim 19, wherein receiving the scanning data comprises receiving scanning data identifying at least one of: one or more reference vehicle license plate numbers and one or more images of reference vehicle license plates.

21. A mobile communication device for forwarding match data to a scanning data server, the mobile communication device comprising:
- a communication module to (i) establish a short-range wireless communication connection with an in-vehicle computing system of a vehicle, (ii) receive the match data from the in-vehicle computing system over the short-range wireless communication connection in response to the in-vehicle computing system identifying a match between scanning data and an image captured by a camera of the vehicle, (iii) establish a long-range wireless communication connection with the scanning data server, and (iv) transmit the match data to the scanning data server over the long-range wireless communication connection.

22. The mobile communication device of claim 21, wherein the communication module comprises long-range communication circuitry and at least one of a near field communication circuitry, a Bluetooth® communication circuit, and a Wi-Fi® communication circuit; and the communication module is to:
- establish the short-range wireless communication connection using the at least one of a near field communication circuitry, a Bluetooth® communication circuit, and a Wi-Fi® communication circuit; and
- establish the long-range wireless communication connection using the long-range communication circuitry.

23. The mobile communication device of claim 21, wherein the scanning data identifies at least one reference vehicle license plate number.

24. The mobile communication device of claim 21, wherein the scanning data comprises an image of at least one reference vehicle license plate.

* * * * *